United States Patent
Fauber et al.

(10) Patent No.: US 11,941,792 B2
(45) Date of Patent: Mar. 26, 2024

(54) MACHINE LEARNING-BASED ANALYSIS OF COMPUTING DEVICE IMAGES INCLUDED IN REQUESTS TO SERVICE COMPUTING DEVICES

(71) Applicant: Dell Products L.P., Round Rock, TX (US)

(72) Inventors: Benjamin Fauber, Austin, TX (US); Lee Saeugling, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 510 days.

(21) Appl. No.: 17/226,305

(22) Filed: Apr. 9, 2021

(65) Prior Publication Data

US 2022/0327678 A1 Oct. 13, 2022

(51) Int. Cl.
*G06T 7/00* (2017.01)
*G06F 18/214* (2023.01)
(Continued)

(52) U.S. Cl.
CPC .......... *G06T 7/0002* (2013.01); *G06F 18/214* (2023.01); *G06F 18/22* (2023.01);
(Continued)

(58) Field of Classification Search
CPC ......... G06T 7/0002; G06T 2207/20072; G06T 2207/20081; G06T 2207/20084;
(Continued)

(56) References Cited

U.S. PATENT DOCUMENTS 8,204,437 B1 * 6/2012 Rothschild ......... H04N 1/00127
455/446
9,503,687 B2 * 11/2016 Kratz ...................... G06T 7/246
(Continued)

OTHER PUBLICATIONS

S. Bandyopadhyay et al, "Unsupervised Classification: Similarity Measures, Classical and Metaheuristic Approaches, and Applications," Springer Verlag, Berlin, Germany, 2013, 270 pages.
(Continued)

*Primary Examiner* — Xuemei G Chen
(74) *Attorney, Agent, or Firm* — Ryan, Mason & Lewis, LLP

(57) ABSTRACT

An apparatus comprises a processing device configured to receive a service request for a given computing device, the service request comprising a given image of a given computing device, to generate a given image embedding for the given image utilizing a machine learning model, and to determine similarity measures between the given image embedding and other image embeddings for other images of computing devices utilizing an angular similarity metric. The processing device is configured to identify whether the given image exhibits at least a threshold level of similarity to at least one other image based at least in part on the determined similarity measures, to classify the given image as potentially fraudulent responsive to identifying the given image as exhibiting at least the threshold level of similarity to at least one other image, and to modify processing of the service request responsive to classifying the given image as potentially fraudulent.

20 Claims, 14 Drawing Sheets

(51) Int. Cl.
  *G06F 18/22* (2023.01)
  *G06F 18/24* (2023.01)
  *G06N 3/04* (2023.01)
  *G06N 3/08* (2023.01)

(52) U.S. Cl.
  CPC ............... *G06F 18/24* (2023.01); *G06N 3/04* (2013.01); *G06N 3/08* (2013.01); *G06T 2207/20072* (2013.01); *G06T 2207/20081* (2013.01); *G06T 2207/20084* (2013.01)

(58) Field of Classification Search
  CPC ........ G06F 18/214; G06F 18/22; G06F 18/24; G06N 3/04; G06N 3/08; G06N 3/045; G06V 10/74; G06V 10/774; G06V 10/82
  See application file for complete search history.

(56) References Cited

U.S. PATENT DOCUMENTS

| | | | | |
|---|---|---|---|---|
| 11,068,693 | B1* | 7/2021 | Alassafi | G06V 10/44 |
| 11,734,570 | B1* | 8/2023 | Kurz | G06F 9/48 |
| | | | | 706/25 |
| 2007/0198286 | A1* | 8/2007 | Tomita | G06F 21/32 |
| | | | | 713/182 |
| 2008/0149725 | A1* | 6/2008 | Rosenbaum | G06Q 20/20 |
| | | | | 235/462.41 |
| 2009/0271433 | A1* | 10/2009 | Perronnin | G06F 17/16 |
| 2013/0191287 | A1* | 7/2013 | Gainer, III | G06Q 20/1085 |
| | | | | 705/44 |
| 2014/0157371 | A1* | 6/2014 | Le Chevalier | G06F 16/958 |
| | | | | 726/4 |
| 2015/0378664 | A1* | 12/2015 | Colmagro | H04L 12/2809 |
| | | | | 455/557 |
| 2017/0118374 | A1* | 4/2017 | Tsujiguchi | G06F 21/84 |
| 2017/0256051 | A1* | 9/2017 | Dwivedi | G06Q 50/00 |
| 2017/0372322 | A1* | 12/2017 | Morey | G06Q 30/012 |
| 2018/0085671 | A1* | 3/2018 | Tsuchiya | G06F 3/01 |
| 2018/0089580 | A1* | 3/2018 | Fu | G06F 16/285 |
| 2018/0314511 | A1* | 11/2018 | Butcher | G06F 8/654 |
| 2019/0197679 | A1* | 6/2019 | Fang | G06N 3/084 |
| 2020/0228972 | A1* | 7/2020 | Choi | H04L 63/0823 |
| 2020/0250537 | A1* | 8/2020 | Li | G06F 18/41 |
| 2020/0286095 | A1* | 9/2020 | Anunciacao | G06F 18/245 |
| 2020/0372789 | A1* | 11/2020 | Norris | G06F 18/22 |
| 2020/0387904 | A1* | 12/2020 | Gosalia | G06Q 20/4014 |
| 2021/0073898 | A1* | 3/2021 | Saiz Serrano | G06K 1/18 |
| 2021/0118119 | A1* | 4/2021 | Yuan | G06T 7/0002 |
| 2021/0124987 | A1* | 4/2021 | Gan | G06F 18/2323 |
| 2021/0232616 | A1* | 7/2021 | Fauber | G06Q 30/018 |
| 2021/0327108 | A1* | 10/2021 | Kumari | G06F 17/11 |
| 2022/0004823 | A1* | 1/2022 | Shoshan | G06F 18/214 |
| 2022/0058375 | A1* | 2/2022 | Kwon | G06T 7/70 |
| 2022/0174076 | A1* | 6/2022 | Nomula | G06V 20/41 |
| 2022/0198711 | A1* | 6/2022 | Mayer | G06N 3/045 |
| 2023/0142023 | A1* | 5/2023 | Shinomiya | G06F 21/6218 |
| | | | | 726/28 |

OTHER PUBLICATIONS

P. W. Battaglia et al., "Relational Inductive Biases, Deep Learning, and Graph Networks," arXiv:1806.01261v3, Oct. 17, 2018, 40 pages.
R. J. Bayardo et al., "Scaling Up All Pairs Similarity Search," Proceedings of the 16th International Conference on World Wide Web (WWW), 2007, pp. 131-140.
J. Betten, "Creep Mechanics," 2nd Edition, Springer Verlag, Berlin, Germany, 2005, 360 pages.
V. D. Blondel et al., "Fast Unfolding of Communities in Large Networks," arXiv:0803.0476v2, Jul. 25, 2008, 12 pages.
L. Bottou, "Stochastic Learning," Lecture Notes in Artificial Intelligence vol. 3176 Subseries of Lecture Notes in Computer Science, Springer, Heidelberg, Germany, 2004, pp. 146-168.
C. Chen et al., "This Looks Like That: Deep Learning for Interpretable Image Recognition," arXiv:1806.10574v5, Dec. 28, 2019, 12 pages.
T. Chen et al., "A Simple Framework for Contrastive Learning of Visual Representations," arXiv:2002.05709v3, Jul. 1, 2020, 20 pages.
T. H. Cormen et al., "Introduction to Algorithms," MIT Press, Cambridge, Massachusetts, 2009, 1313 pages.
R. Diestel, "Graph Theory," Springer Press, New York, New York, Electronic Edition 2000, 422 pages.
A. Dosovitskiy et al., "Discriminative Unsupervised Feature Learning with Convolutional Neural Networks," arXiv:1406.6909v2, Jun. 19, 2015, 14 pages.
J. Eakins et al., "Content-Based Image Retrieval," Technical Report 39, Department of Computer and Information Sciences, Northumbria University, Newcastle upon Tyne, England, 1999, 54 pages.
S. Fortunato et al., "Community Detection in Networks: A User Guide," arXiv:1608.00163v2, Nov. 3, 2016, 43 pages.
M. Gutmann et al., "Learning Features by Contrasting Natural Images with Noise," Proceedings of the International Conference on Artificial Neural Networks, 2009, 10 pages.
M. Gutmann et al., "Noise-Contrastive Estimation: A New Estimation Principle for Unnormalized Statistical Models," Proceedings of the 13th International Conference on Artificial Intelligence and Statistics, 2010, 8 pages.
R. Hadsell et al., "Dimensionality Reduction by Learning an Invariant Mapping," Proceedings of the IEEE Conference on Computer Vision and Pattern Recognition, 2006, 8 pages.
K. He et al., "Deep Residual Learning for Image Recognition," arXiv:1512.03385v1, Dec. 10, 2015, 12 pages.
S. Ioffe et al., "Batch Normalization: Accelerating Deep Network Training by Reducing Internal Covariate Shift," arXiv:1502.03167v3, Mar. 2, 2015, 11 pages.
J. Jain et al., "Python for Graph and Network Analysis," Advanced Information and Knowledge Processing Series. Springer International Publishing, 2017, 214 pages.
G. James et al., "An Introduction to Statistical Learning: with Applications in R," Springer Science+Business Media, New York, New York, 2013, 441 pages.
A. Khosla et al., "Novel Dataset for Fine-Grained Image Categorization," Proceedings of the IEEE Conference on Computer Vision and Pattern Recognition, 2011, 2 pages.
A. Krizhevsky et al., "ImageNet classification with Deep Convolutional Neural Networks," Proceedings of the 25th International Conference on Neural Information Processing Systems, 2012, 9 pages.
Y. Lecun et al., "Deep Learning," Nature, vol. 521, May 28, 2015, pp. 437-444.
M. E. J. Newman, "Networks: An Introduction," Oxford University Press, New York, New York, 2017, Contents Only, 6 pages.
C. Pozrikidis, "Introduction to Grids, Graphs, and Networks," Oxford University Press, New York, New York, 2014, Contents Only, 9 pages.
F. Radenovic et al., "Fine-tuning CNN Image Retrieval with No Human Annotation," arXiv:1711.02512v2, Jul. 10, 2018, 14 pages.
Y. Tian et al., "Contrastive Multiview Coding," arXiv:1906.05849v5, Dec. 18, 2020, 16 pages.
A. Torralba et al., "80 Million Tiny Images: A Large Data Set for Non-Parametric Object and Scene Recognition," IEEE Transactions on Pattern Analysis and Machine Intelligence, 2008, 12 pages.
A. Van Den Oord et al., "Representation Learning with Contrastive Predictive Coding," arXiv:1807.03748v2, Jan. 22, 2019, 13 pages.
P. Welinder et al., "Caltech-UCSD Birds 200, Technical Report CNS-TR-2010-001," Department of Computing and Mathematical Sciences, California Institute of Technology, Pasadena, California, 2010, 15 pages.
Z. Wu et al., "Unsupervised Feature Learning via Non-Parametric Instance Discrimination," arXiv:1805.01978v1, May 5, 2018, 10 pages.
C. Zhuang et al., "Local Aggregation for Unsupervised Learning of Visual Embeddings," arXiv:1903.12355v, Apr. 10, 2019, 13 pages.

* cited by examiner

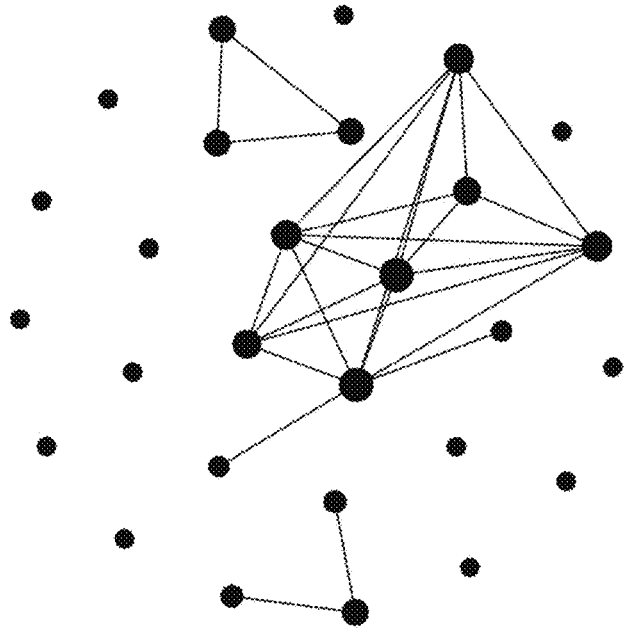
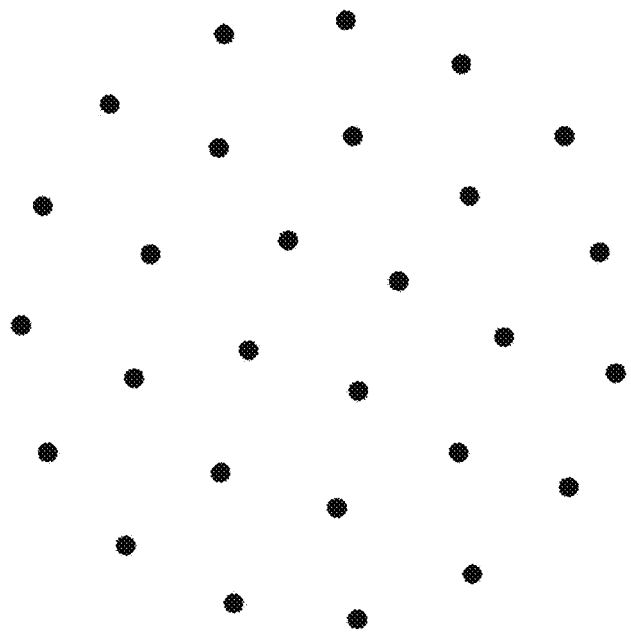
FIG. 8

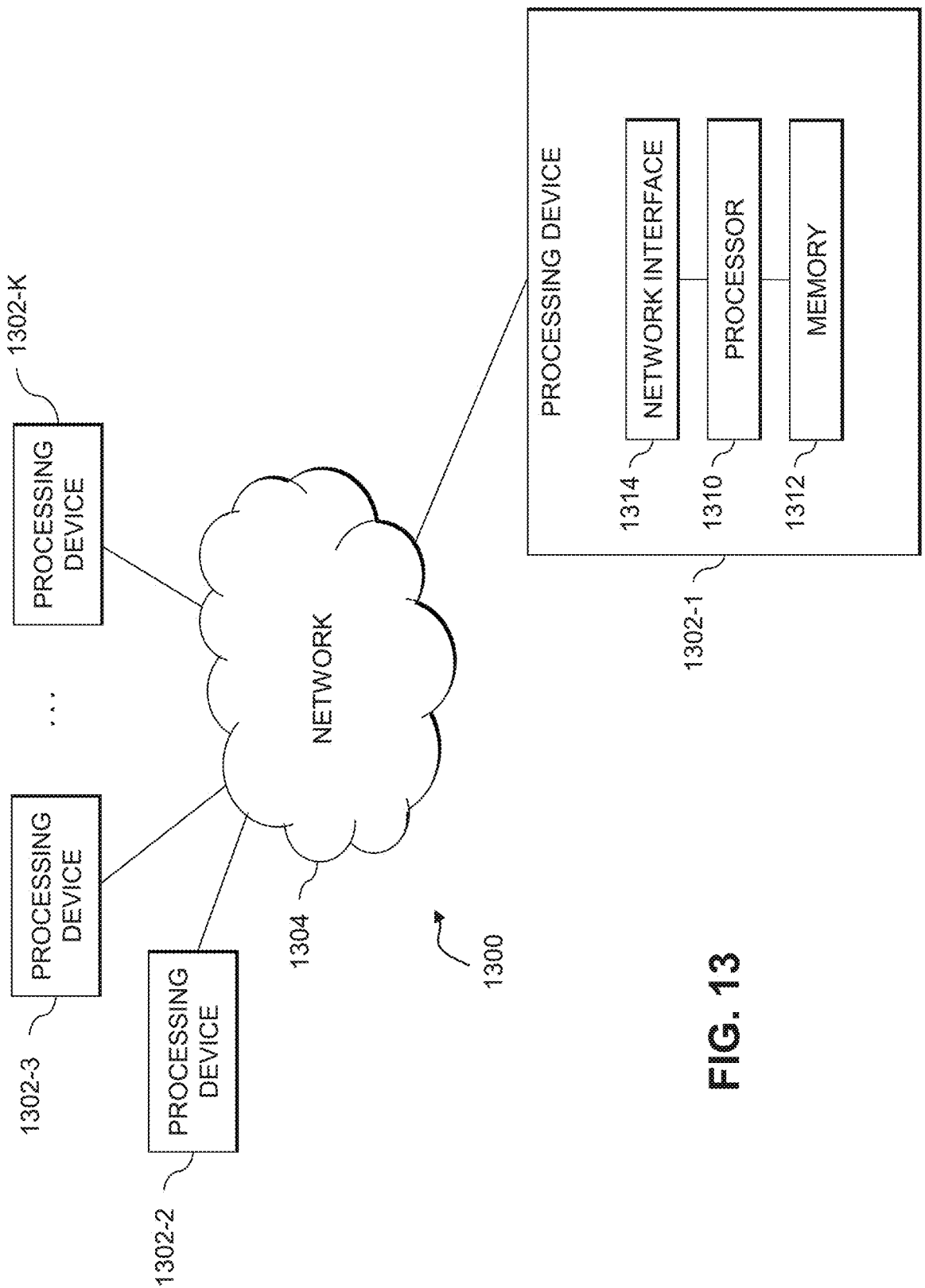

MACHINE LEARNING-BASED ANALYSIS OF COMPUTING DEVICE IMAGES INCLUDED IN REQUESTS TO SERVICE COMPUTING DEVICES

FIELD

The field relates generally to information processing, and more particularly to device management in information processing systems.

BACKGROUND

Support platforms may be utilized to provide various services for computing devices managed by the support platforms. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for machine learning-based analysis of computing device images included in requests to service computing devices.

In one embodiment, an apparatus comprises at least one processing device comprising a processor coupled to a memory. The at least one processing device is configured to perform the steps of receiving a service request for a given computing device, the service request comprising a given image of a given computing device, and generating, utilizing a machine learning model, a given image embedding for the given image. The at least one processing device is further configured to perform steps of determining similarity measures between the given image embedding for the given image and one or more other image embeddings for one or more other images of computing devices utilizing an angular similarity metric, identifying whether the given image exhibits at least a threshold level of similarity to at least one of the one or more other images based at least in part on the determined similarity measures, and classifying the given image as potentially fraudulent responsive to identifying the given image as exhibiting at least the threshold level of similarity to said at least one of the one or more other images. The at least one processing device is further configured to perform the step of modifying processing of the service request responsive to classifying the given image as potentially fraudulent.

These and other illustrative embodiments include, without limitation, methods, apparatus, networks, systems and processor-readable storage media.

BRIEF DESCRIPTION OF THE DRAWINGS

FIG. 8 shows an image graph network for which image clusters are identified in an illustrative embodiment.

FIGS. 12 and 13 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
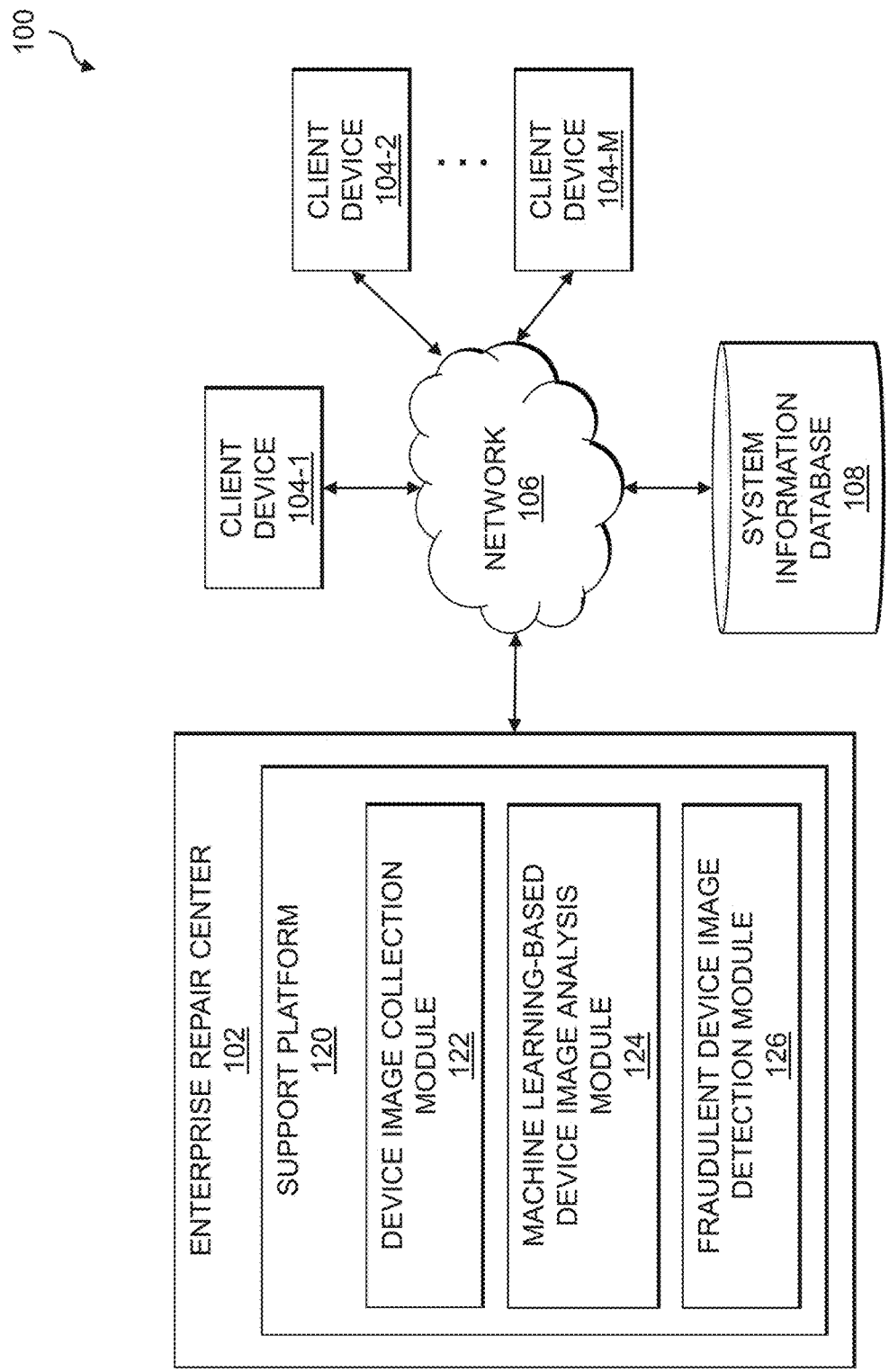
FIG. 1 is a block diagram of an information processing system configured for machine learning-based analysis of computing device images included in requests to service computing devices in an illustrative embodiment.

FIG. 1 shows an information processing system 100 configured in accordance with an illustrative embodiment. The information processing system 100 is assumed to be built on at least one processing platform and provides functionality for machine learning-based analysis of computing device images included in requests to service computing devices. The information processing system 100 includes an enterprise repair center 102 and a plurality of client devices 104-1, 104-2, . . . 104-M (collectively, client devices 104) that are coupled to a network 106. Also coupled to the network 106 is a system information database 108, which may store various information relating to the client devices 104 (e.g., device images, device identifying information, user identifying information, image embeddings, similarity measures, etc.).

The enterprise repair center 102 in the FIG. 1 embodiment includes a support platform 120, which is assumed to provide support services for the client devices 104. The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 104 comprise assets of an information technology (IT) infrastructure operated by an enterprise, and the enterprise repair center 102 is configured to provide support services for such assets using the support platform 120.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

As noted above, in some embodiments the support platform 120 of the enterprise repair center 102 is used for providing support services for an enterprise system (e.g., an IT infrastructure comprising the client devices 104). For example, an enterprise may subscribe to or otherwise utilize the support platform 120 to manage a set of assets (e.g., the client devices 104) operated by users of the enterprise. As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The system information database 108, as discussed above, is configured to store and record information relating to the client devices 104 or other assets that are managed using the support platform 120. Such information illustratively includes device or system state information, logs of repairs and troubleshooting actions performed on the client devices 104, details of warranties or other support services subscribed to for different ones of the client devices 104, etc. The system information database 108 may also include logs of service requests, and device images associated with such service requests. Such device images may include device identifying information and user identifying information for the users submitting the service requests. The system information database 108 may further include training data for a machine learning model used to analyze device images, image embeddings for device images analyzed using the machine learning model, graph networks of the device images (e.g., including similarity and adjacency matrices used to construct the graph networks), cluster information for device images, etc. The system information database 108 in some embodiments is implemented using one or more storage systems or devices associated with the support platform 120. In some embodiments, one or more of the storage systems utilized to implement the system information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102 and/or support platform 120, as well as to support communication between the enterprise repair center 102, the support platform 120 and other related systems and devices not explicitly shown.

The support platform 120 may be operated by a hardware vendor that manufactures and sells computing devices (e.g., desktops, laptops, tablets, smartphones, etc.), and the client devices 104 may represent computing devices sold by that hardware vendor. The support platform 120, however, is not required to be operated by a hardware vendor that manufactures and sells computing devices. Instead, the support platform 120 may be offered as a service to provide support for computing devices that are sold by any number of hardware vendors. The client devices 104 may subscribe to the support platform 120, so as to provide support including troubleshooting of hardware and software components of the client devices 104. Various other examples are possible.

In some embodiments, the client devices 104 may implement host agents that are configured for automated transmission of information regarding the client devices 104 (e.g., such as in the form of telemetry information periodically provided to the support platform 120) in conjunction with service requests that are submitted to the support platform 120. Such information may include device images that include device identifying information for a computing device to be serviced, as well as user identifying information for a user submitting the request for servicing of that computing device. Such host agents may also be configured to automatically receive from the support platform 120 various support information (e.g., details of troubleshooting and repair actions performed on or for the client devices 104, support services that are available to the client devices 104, etc.). The host agents may comprise support software that is installed on the client devices 104.

It should be noted that a "host agent" as this term is generally used herein may comprise an automated entity, such as a software entity running on a processing device. Accordingly, a host agent need not be a human entity.

As shown in FIG. 1, the enterprise repair center 102 includes the support platform 120. The support platform 120, as will be described in further detail below, is configured to analyze device images submitted with servicing requests to determine potentially fraudulent service requests. A fraudulent service request, for example, may utilize a device image from a previously-submitted service request. In some cases, the device image in the fraudulent service request includes some modification to device or user identifying information included in the device image (e.g., a change to one or more digits, characters or other portion of a serial number, product tag, barcode, quick response (QR) code, username, etc.). Even with such modification, the device image in the fraudulent service request may still have other characteristics detectable using the techniques described herein that are sufficient to determine similarity to device images from previously-submitted service requests. For example, the lighting of the device images may be similar, the angle or view of the computing device (as well as a piece of paper including user identifying information that is placed on or next to the computing device) may be similar, combinations thereof, etc.

Although shown as an element of the enterprise repair center 102 in this embodiment, the support platform 120 in other embodiments can be implemented at least in part externally to the enterprise repair center 102, for example, as a stand-alone server, set of servers or other type of system coupled to the network 106. In some embodiments, the support platform 120 or components thereof may be implemented at least in part within one or more of the client devices 104.

The support platform 120 in the FIG. 1 embodiment is assumed to be implemented using at least one processing device. Each such processing device generally comprises at least one processor and an associated memory, and implements one or more functional modules for controlling certain features of the support platform 120. In the FIG. 1 embodiment, the support platform 120 includes a device image collection module 122, a machine learning-based device image analysis module 124, and a fraudulent device image detection module 126.

The support platform 120 is configured to identify servicing requests submitted by users of the client devices 104 for servicing of computing devices (which may be the client devices 104 themselves). Such servicing requests are assumed to include images of the computing devices to be serviced, where such device images include or show at least some portion of device identifying information of a computing device (e.g., a serial number, product or service tag, barcode, QR code, etc.) as well as user identifying information for a user submitting the servicing request (e.g., such as a username or other user credentials written on a piece of paper that is placed on or near the computing device and is within the frame of the device image). The device image collection module 122 is configured to obtain such device images, and to provide them to the machine learning-based device image analysis module 124.

The machine learning-based device image analysis module 124 is configured to utilize one or more machine learning models (e.g., such as a convolutional neural network (CNN) model) to generate image embeddings for the device images. The image embeddings may include an output of a fully connected layer of the machine learning model which has been subject to normalization and dimensionality reduction. The machine learning-based device image analysis module 124 is further configured to determine similarity measures between device images based at least in part on one or more similarity metrics (e.g., an angular similarity metric) of the image embeddings associated with such device images.

The fraudulent device image detection module 126 is configured to identify whether a given device image exhibits at least a threshold level of similarity to at least one other device image (e.g., whether a device image for a current service request is substantially similar to a device image from a prior service request, such as being a duplicate of the device image from the prior service request or a modification thereof). The fraudulent device image detection module 126 is further configured to classify the given device image as potentially fraudulent responsive to identifying the given device image as exhibiting at least the threshold level of similarity to said at least one of the one or more other device images. This may cause the support platform 120 to perform various remedial actions, such as subjecting the given device image to further scrutiny or analogous (e.g., to determine whether the given device image is, in fact, fraudulent), requesting a new device image from the user submitting the service request, rejecting the service request, requiring additional diagnostics or verification of the service request (e.g., prior to sending replacement parts or components to the user submitting the service request), flagging the user submitting the service request as a potentially malicious user (and thus subjecting subsequent service requests received from that user as potentially fraudulent), etc.

It is to be appreciated that the particular arrangement of the enterprise repair center 102, client devices 104, support platform 120, device image collection module 122, machine learning-based device image analysis module 124, and fraudulent device image detection module 126 illustrated in the FIG. 1 embodiment is presented by way of example only, and alternative arrangements can be used in other embodiments. As discussed above, for example, the support platform 120 or one or more components thereof may be implemented external to the enterprise repair center 102. As another example, the functionality associated with the device image collection module 122, the machine learning-based device image analysis module 124, and the fraudulent device image detection module 126 may be combined into fewer modules, or separated across more modules with the multiple modules possibly being implemented with multiple distinct processors or processing devices.

At least portions of the device image collection module 122, the machine learning-based device image analysis module 124, and the fraudulent device image detection module 126 may be implemented at least in part in the form of software that is stored in memory and executed by a processor.

It is to be understood that the particular set of elements shown in FIG. 1 for machine learning-based analysis of computing device images included in requests to service computing devices is presented by way of illustrative example only, and in other embodiments additional or alternative elements may be used. Thus, another embodiment may include additional or alternative systems, devices and other network entities, as well as different arrangements of modules and other components.

By way of example, in other embodiments, the support platform 120 may be implemented external to the enterprise repair center 102, such that the enterprise repair center 102 can be eliminated.

The support platform 120 and other portions of the system 100, as will be described in further detail below, may be part of cloud infrastructure.

The client devices 104, the support platform 120 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and the support platform 120, or components thereof, may be implemented on respective distinct processing platforms, although numerous other arrangements are possible. For example, in some embodiments at least portions of the support platform 120 and one or more of the client devices 104 are implemented on the same processing platform. A given client device (e.g., 104-1) can therefore be implemented at least in part within at least one processing platform that implements at least a portion of the support platform 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise repair center 102, the support platform and the client devices 104, the system information database 108, or portions or components thereof, to reside in different data centers. Numerous other distributed implementations are possible. The support platform 120 can also be implemented in a distributed manner across multiple data centers. Additional examples of processing platforms utilized to implement the client devices 104, support platform 120 and other components of the system 100 in illustrative embodiments will be described in more detail below in conjunction with FIGS. 12 and 13.

It is to be appreciated that these and other features of illustrative embodiments are presented by way of example only, and should not be construed as limiting in any way.

An exemplary process for machine learning-based analysis of computing device images included in requests to service computing devices will now be described in more detail with reference to the flow diagram of FIG. 2. It is to be understood that this particular process is only an example, and that additional or alternative processes for machine learning-based analysis of computing device images included in requests to service computing devices may be used in other embodiments.

In this embodiment, the process includes steps 200 through 210. These steps are assumed to be performed by the support platform 120 utilizing the device image collection module 122, the machine learning-based device image analysis module 124, and the fraudulent device image detection module 126. The process begins with step 200, receiving a service request for a given computing device, the service request comprising a given image of the given computing device. The given image may comprise device identifying information for the given computing device and user identifying information for a user submitting a service request for the given computing device. The device identifying information for the given computing device may comprise at least a portion of at least one of a serial number and a product tag of the given computing device.

In step 202, a given image embedding for the given image is generated utilizing a machine learning model. The machine learning model may comprise a convolutional neural network (CNN). The CNN may comprise one or more convolutional layers, one or more pooling layers, and a fully connected layer. The given image embedding for the given image may comprise a normalized representation of an output of the fully connected layer. The output of the fully connected layer of the machine learning model may be subject to dimensionality reduction prior to normalization to produce the given image embedding for the given image. In some embodiments, the machine learning model is trained utilizing a contrastive loss function that determines similarity between pairs of images in a training data set, the pairs of images in the training data set comprising two or more copies of at least one image having different image transforms applied thereto.

Similarity measures between the given image embedding for the given image and one or more other image embeddings for one or more other images of computing devices are determined in step 204 utilizing an angular similarity metric. The angular similarity metric may comprise a cosine similarity metric. The FIG. 2 process continues with step 206, identifying whether the given image exhibits at least a threshold level of similarity to at least one of the one or more other images based at least in part on the determined similarity measures. The given image is then classified as potentially fraudulent in step 208 responsive to identifying the given image as exhibiting at least the threshold level of similarity to said at least one of the one or more other images. Step 208 may comprise determining that at least one of the device identifying information and the user identifying information in the given image comprises a modification of at least one of device identifying information and user identifying information in said at least one of the one or more other images.

In step 210, processing of the service request is modified responsive to classifying the given image as potentially fraudulent. Step 210 may include, for example, rejecting the service request, or subjecting the service request to further scrutiny or investigation prior to approval or prior to performing certain actions as part of the service request (e.g., such as providing replacement component parts to the user submitting the service request). Step 210, in some embodiments, comprises requesting that a user submitting the service request submit a new or additional image of the given computing device to be serviced (e.g., taken at a different angle or distance from the given computing device, etc.). Various other actions may be taken to modify the processing of the service request responsive to classifying the given image as potentially fraudulent.

Figure 2:
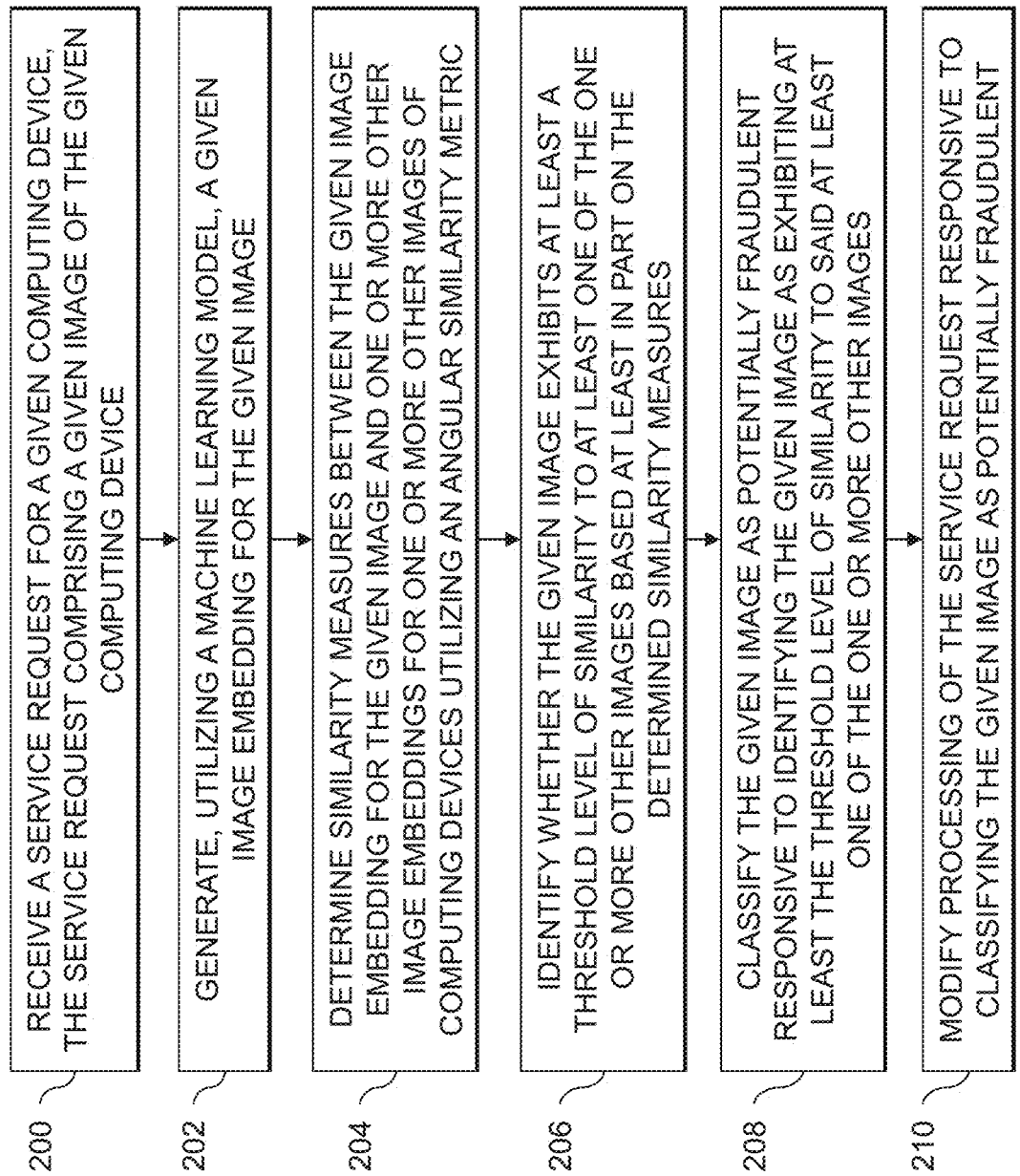
FIG. 2 is a flow diagram of an exemplary process for machine learning-based analysis of computing device images included in requests to service computing devices in an illustrative embodiment.

The FIG. 2 process may further comprise generating a graph network of a plurality of images comprising the given image and the one or more other images, the graph network comprising nodes representing respective ones of the plurality of images and edges connecting pairs of images in the plurality of images, the edges being created based at least in part on the determined similarity measures. Determining the similarity measures between the given image embedding for the given image and the one or more other image embeddings for one or more other images of computing devices utilizing the angular similarity metric may comprise generating a similarity matrix having entries comprising the similarity measures. Identifying the given image as the duplicate of said at least one of the one or more other images based at least in part on the determined similarity measures may comprise applying a thresholding filter to the similarity matrix to produce an adjacency matrix, the adjacency matrix having entries comprising values defining the edges of the graph network. The FIG. 2 process may further comprise detecting one or more clusters of images in the plurality of images by applying one or more community detection algorithms to the graph network. The one or more community detection algorithms may comprise a Louvain community detection algorithm.

Assessing the similarity of images is an evolving area of computer vision technology, which has various applications including but not limited to content-based image retrieval, record alignment, anomaly detection, etc. Illustrative embodiments provide algorithms that create image embeddings based on visual image content and cluster similar images with favorable cluster contents. Low-dimensional normalized representations of images are evaluated for their similarities in some embodiments using an angular similarity metric. Similarity results in some embodiments are subjected to a hyper-parameterized Heaviside function to create an adjacency matrix that is equivalent to a graph network. The edges of the graph network connect similar images, and community detection algorithms applied to the graph network provides clusters of similar images.

Content-based image retrieval uses the visual content of a query image to identify the most relevant or similar images within a database or other collection of images. In contrast to keyword-based indexing and retrieval, where images are organized according to simple textual tags, content-based retrieval aims to fetch images using only their visual content. Image recognition and retrieval tasks are more and more challenging, due to the numerous and rapidly growing sources of image data. It is increasingly easy and inexpensive to capture and store image data, but organizing and indexing such data presents significant technical and computational challenges. Further, comparing the thousands to millions of pixels in an image, or frame of a video, to all images in a database presents its own computational challenges. As a database or storage of images grows in size, simple image comparison approaches become intractable. Thus, a low-dimensional representation of each image is desired for improved retrieval performance and viability.

Dimensionality reduction aims to translate high dimensional data to a low dimensional representation, such that similar input objects are mapped to nearby points on a manifold. The process of mapping a set of high dimensional points onto a low dimensional manifold may use various approaches. Two examples of dimensionality reduction methods are principal component analysis (PCA) and multi-dimensional scaling (MDS). A major drawback of such approaches, however, is that neither attempts to compute a function that could map new unknown data points without recomputing the entire embedding, and without knowing its relationships to the training data points.

A convolutional neural network (CNN) is a trainable, non-linear machine learning algorithm that operates on images at the pixel level and learns low-level features and high-level representations in an integrated manner. CNNs may be trained end-to-end to map images to outputs. CNNs can learn optimal shift invariant local feature detectors while maintaining invariance to geometric distortions of the input due to their shared structure of weights and multiple network layers. Image descriptors based on activations of CNNs have become a dominant method in image retrieval due to their discriminative power, compactness or representation, and search efficiency. Illustrative embodiments leverage a final, fully connected layer of a CNN as a low-dimensional representation of an input image. The advantage of this approach is that the learned functions of the CNN can be used to map new samples not seen during training (e.g., an ability to learn out of sample data).

Image recognition is a classic challenge in computer vision when attempting to learn visual categories. Historically, computer vision approaches have segmented image recognition into two cases: the specific (e.g., detection) case and the categorical case. The specific case attempts to detect instances of a place, object or person (e.g., Albert Einstein's face, the Eiffel Tower, etc.). In contrast, the categorical case attempts to recognize objects of an undefined category as belonging to a defined class (e.g., dogs, cats, etc.). Additionally, the categorical case may contain wide variations in each class due to differences in appearance amongst class members due to changes in pose, lighting, occlusion, and general class variance (e.g., the variety of colors, posture and plumage of birds, etc.).

Image similarity is a new, third case of image recognition. Image similarity seeks to understand which images are similar, based on a similarity metric, and often simultaneously addresses the detection and classifications of objects within the image. Similarity treats image data as a continuum of information and represents an important advancement for computer vision, yet also presents significant challenges in assessing similarity across many instances. Determination of image similarity is pertinent to both image retrieval and image recognition tasks. However, the image retrieval task poses an additional challenge in that a potentially large amount of data must be properly indexed to perform efficient real-time searches. A fundamental weakness of prototypical deep learning is that is requires a lot of labeled data to work well. Historically, large CNN performance increases for image recognition tasks were only possible due to the manual annotation of millions of training images. For this reason, unsupervised learning is an appealing paradigm as it can use raw unlabeled images.

Detection of similarity between images is important for various tasks. Detecting similarity between images, however, is difficult to perform manually particularly as the number of images to be processed increases. Consider, as an example, device warranty services. A device vendor, or an operator of a warranty or repair center, strives to deliver value for users in a timely manner. This may rely on users similarly behaving reasonably and honestly. There is a subset of users, however, that may behave abnormally and seek to defraud the device vendor or the operator of the warranty or repair center. Illustrative embodiments provide techniques for detecting such abnormal user behavior through graph network analysis of image embeddings.

Figure 3:
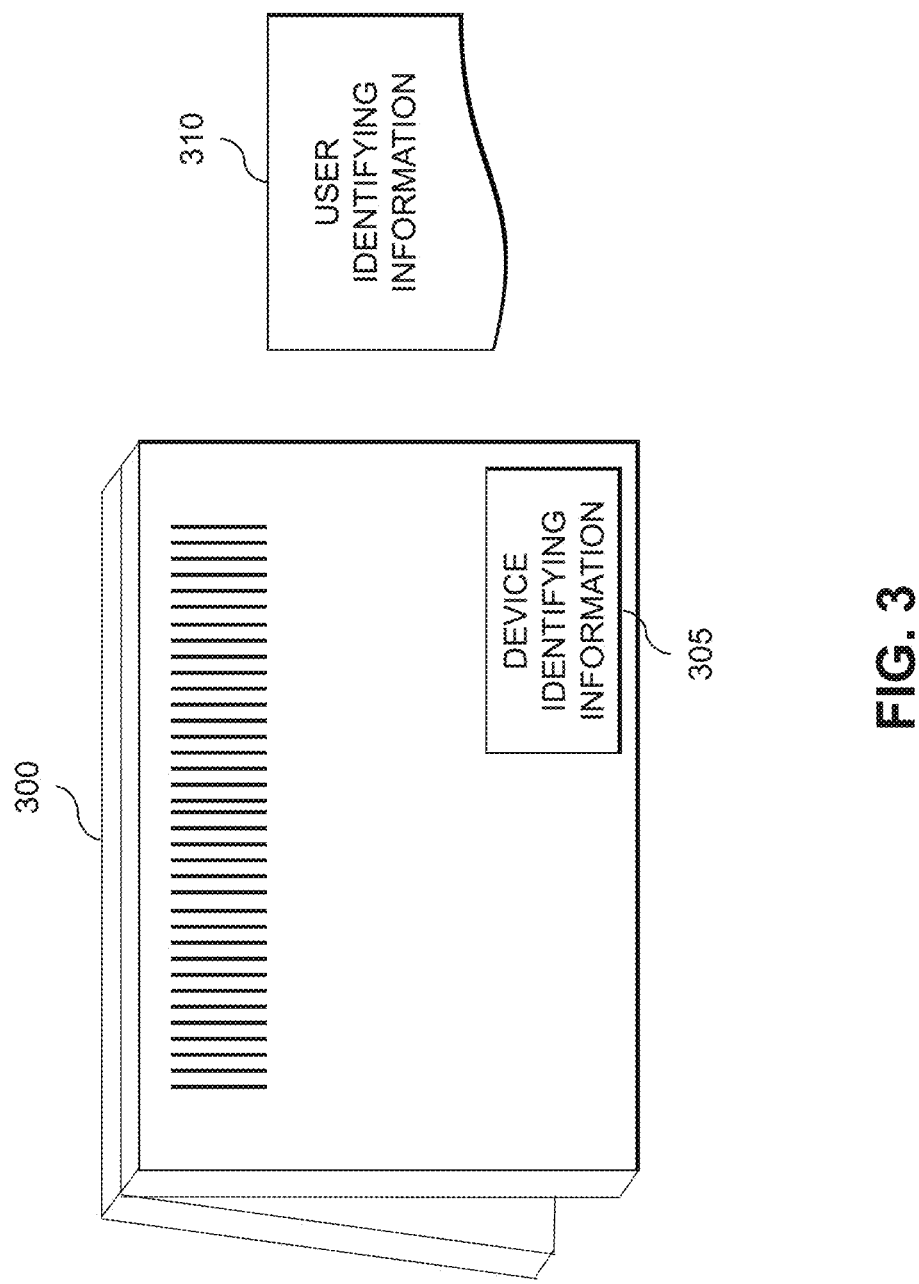
FIG. 3 shows an image of device and user identifying information for a device to be serviced in an illustrative embodiment.

When a customer or end-user seeks to obtain warranty services, that customer or end user may provide a picture of at least a portion of the device to be serviced (e.g., a picture of a service tag, serial number or other identifying information of the device to be serviced) along with a piece of paper next to the device with that customer or end user's name or other identifier along with date and/or time information (collectively referred to as user identifying information). FIG. 3, for example, illustrates an image of a device 300 (e.g., an underside of a laptop) that includes device identifying information 305 along with a piece of paper 310 with user identifying information.

Malicious users may seek to defraud the provider of device warranty services (e.g., an enterprise repair center) by altering an image of a device to be serviced, either by altering the service tag, serial number or other identifying information of the device to be serviced or by altering the piece of paper including the customer or end user's name or other identifier along with date and/or time information. For example, it may be fairly easy for a malicious user to find an image of a device to be serviced, and then alter that image by changing digits or characters of a service tag, serial number or other identifying information. A conventional approach to combating such potentially malicious activity may involve a human analyst determining if an image has been altered only when fraud is suspected, as image analysis is a difficult and time consuming task on even small datasets (e.g., of a few hundred images) and is nearly impossible on moderate to large datasets (e.g., a few thousand to hundreds of thousand or more images). Thus, the manual approach cannot scale. To counter such issues, some embodiments utilize an image similarity detection algorithm that is configured to automatically identify and cluster images that are substantially similar based on some user-defined threshold. This automated approach is highly scalable, and thus may be applied to all warranty service requests not just those suspected of fraud. In this way, illustrative embodiments can identify potential fraud cases that a human analyst cannot. Further, the image similarity detection algorithm may be used to analyze all historical images.

The image similarity detection algorithm may analyze images (e.g., such as that shown in FIG. 3, where the images include identifying information for a device to be serviced and identifying information for a user associated with that device) to generate image embeddings. The image embeddings are then analyzed for approximate matches, to determine for a given image if the given user submitting that image (or another user) has submitted similar but not the same images while seeking services from a repair or warranty center (e.g., to seek a commodity or part from the repair or warranty center). The approximate image match information may be combined with database information to create a graph network of image embeddings and similarity scores. The graph network may be used to provide insights, connectivity information and image comparisons to analysts that are not available using conventional approaches.

Approaches for assessing image similarity may focus on unsupervised "contrastive learning," where algorithms attempt to learn what makes two images similar or different. In some embodiments, contrastive learning algorithms adopt a Residual Network (ResNet) CNN architecture as the encoder to obtain embeddings $u_i = f_\theta(x_i) = \text{ResNet}(x_i)$, where $u_i \in \mathcal{R}^d$ is the output after the average pooling layer of the ResNet CNN. Batch L2-normalization is used, enforcing $\|u_i\|_2 = 1$, to generate normalized 128-dimensional image embeddings u.

Figure 4A:
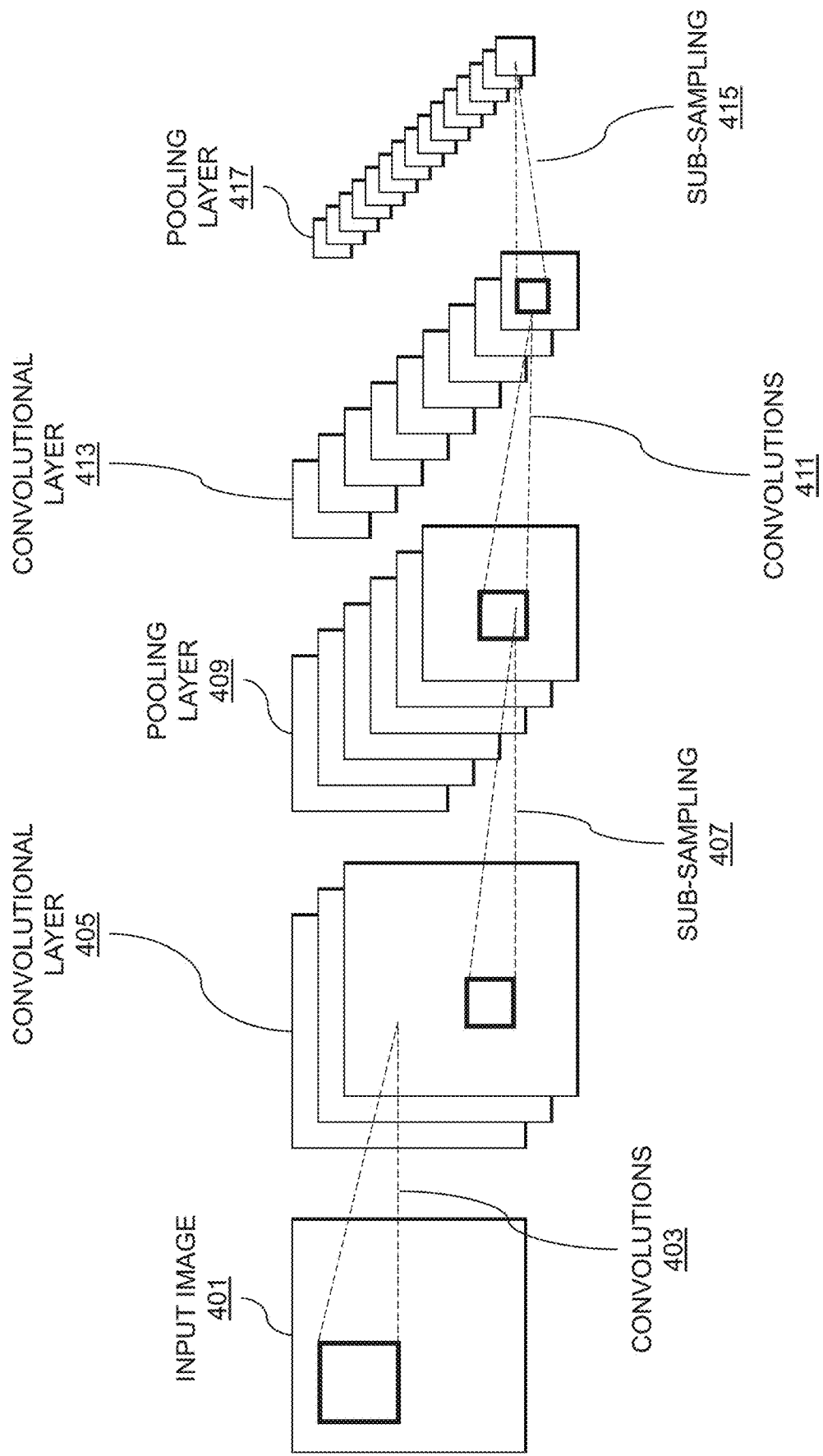
FIGS. 4A and 4B show an architecture of a machine learning model configured to produce image embeddings in an illustrative embodiment.
Figure 4B:
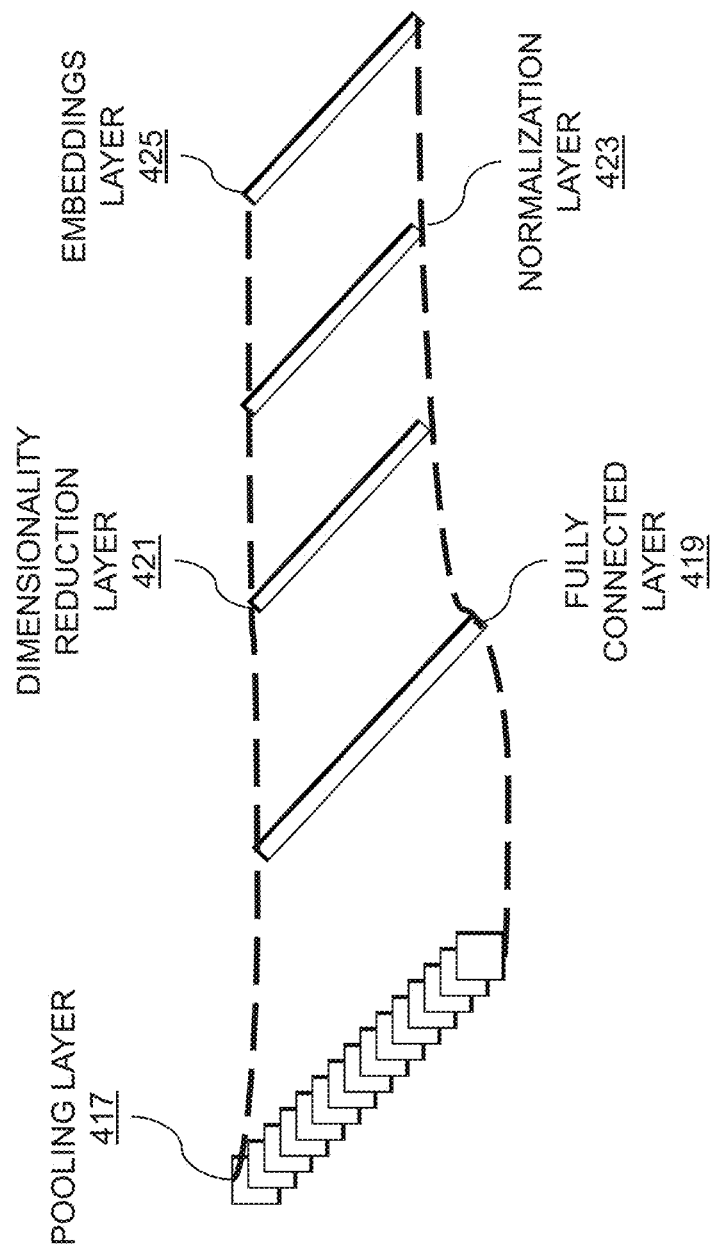

FIGS. 4A and 4B illustrate a machine learning model architecture model configured to generate clusters of similar images. As shown in FIG. 4A, an input image 401 is provided as input to a ResNet CNN. The ResNet CNN "backbone" includes a set of convolutional and pooling layers which alternately apply convolutions and subsampling operations to the input from the previous layer, and ends with a fully-connected layer. More specifically, convolutions 403 are applied to the input image 401 by a convolutional layer 405. Subsampling 407 is then applied by a pooling layer 409. Convolutions 411 are again applied by convolutional layer 413, followed by subsampling 415 by a pooling layer 417. As shown in FIG. 4B, the pooling layer 417 is coupled to a fully connected layer 419, which is in turn coupled to a dimensionality reduction layer 421. The dimensionality reduction layer 421 is coupled to a normalization layer 423 (e.g., an L2 normalization layer) which produces embeddings 425. In some embodiments, the fully connected layer 419 has 2048 dimensions, which is reduced to 128 dimensions by the dimensionality reduction layer 421. The CNN image encoder, denoted as $f_\theta(\bullet)$, has output from the fully connected layer 419. Following dimensionality reduction to a low-dimensional representation (128-d) by the dimensionality reduction layer 421, the normalization layer 423 produces an L2-normalized representation providing image embeddings, denoted u.

Contrastive learning loss functions measure the similarities of sample pairs in a representation space. The CNN encoder used in some embodiments, denoted $f_\theta(\bullet)$, is trained with a contrastive learning loss function $\mathcal{L}(\bullet)$ and a "projection head" modified network architecture. The CNN parameters, denoted $\theta$, are optimized with stochastic gradient descent (SGD) to minimize $\mathcal{L}(\bullet)$. After the CNN is trained, the network projection head is removed and the headless network is used as the encoder $f_\theta(\bullet)$ to generate image embeddings u during inference.

A set of n images $x_1, \ldots, x_n$ are stochastically augmented with k image transforms, such as rotations, cropping, noising, blurring, coloration, combinations thereof, etc., to generate two correlated views of the same image, denoted as $x_i^k$, where k represent the transform method. The original and transformed images are used to train $f_\theta(\bullet)$. The CNN encoder $f_\theta(\bullet)$ is optimized with SGD and a contrastive learning loss function $\mathcal{L}(\bullet)$. In some embodiments, the contrastive learning loss function $\mathcal{L}(\bullet)$ is based on a modification of noise-contrastive estimation (NCE) referred to as InfoNCE. InfoNCE optimizes a binary classifier to discriminate between samples from the data distribution and samples from a noise distribution, based on the ratio of probabilities of the sample under the model and the noise distribution. The InfoNCE contrastive loss function estimates the parameters of the CNN by learning to discriminate between the data and some artificially generated noise. In this paradigm, the noising transforms k play an important role in the optimization of $f_\theta(\bullet)$, as $\mathcal{L}(\bullet)$ optimization relies on noise with which the data is contrasted.

The InfoNCE contrastive loss function $\mathcal{L}(\bullet)$ assumes here is a single instance of an embedding $u^+$ that matches $u_i$, and this match is considered a positive pair. The encoder $f_\theta(\bullet)$ utilizes a L2-normaliziation layer, so that similarity between two embeddings u can be evaluated with an inner product (e.g., a dot product) where the value of $\mathcal{L}(\bullet)$ will be low when $u_i$ is similar to its positive pair $u^+$, and dissimilar to all other negative pair instances of u. The InfoNCE contrastive loss function $\mathcal{L}(\bullet)$ is shown in Equation (1) below, where similarity is measured by inner product and $\xi$ is a temperature hyperparameter:

$$\mathcal{L}(u_i) = -\log\left(\frac{\exp(u_i \cdot u^+/\tau)}{\sum_{j=0}^{M} \exp(u_i \cdot u_j/\tau)}\right)$$

In some embodiments, the value of the temperature hyperparameter $\tau = 0.07$ and $M = 4,096$ provides favorable outcomes. In other embodiments, however, different values of $\tau$ and M may be used. The InfoNCE contrastive loss function $\mathcal{L}(\bullet)$ calculates the sum over one positive ($u^+$) and M negative samples of $u_i$. Principally, $\mathcal{L}(\bullet)$ is the log loss of a (M+1)-way softmax-based binary classifier that tries to classify $u_i$ as $u^+$. The advantage of InfoNCE is that it fits models which are not explicitly normalized, making the model training time independent of the data set size. This approach greatly improves performance by reducing the computational complexity from O(n) to O(1) per sample.

Figure 5:
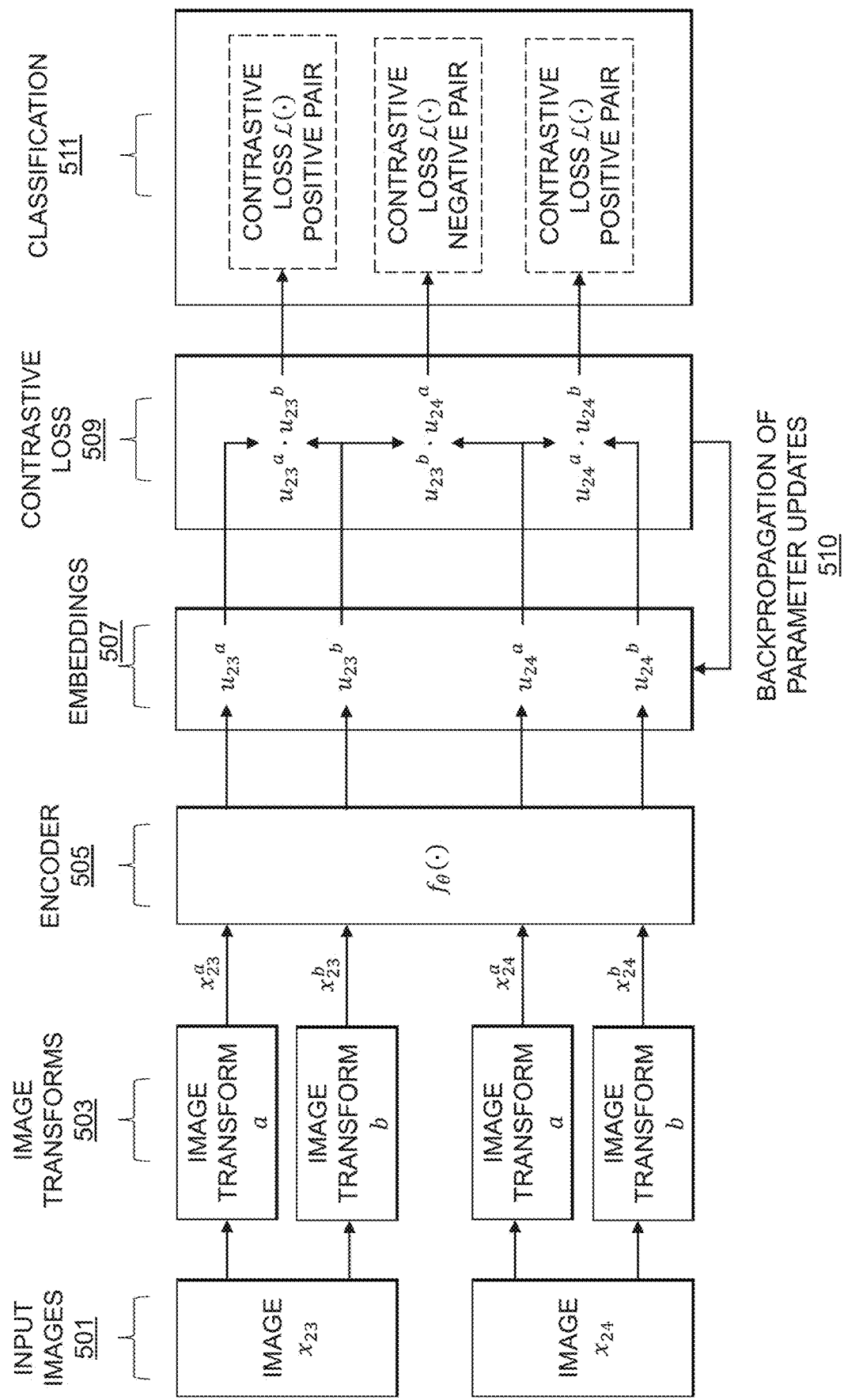
FIG. 5 shows a system flow for classification of image similarity using a machine learning model in an illustrative embodiment.

FIG. 5 illustrates a contrastive learning framework for training the encoder $f_\theta(\cdot)$. As shown, multiple input images 501 (denoted $x_{23}$ and $x_{24}$) are subject to image transforms 503 (e.g., transforms k, including image transforms a and b). The transformed images ($x_{23}^a$, $x_{23}^b$, $x_{24}^a$, and $x_{24}^b$) are supplied to the encoder 505 (CNN encoder $f_\theta(\cdot)$, which produces corresponding embeddings 507 ($u_{23}^a$, $u_{23}^b$, $u_{24}^a$, $u_{24}^b$) The embeddings 507 are compared against one another using contrastive loss $\mathcal{L}(\cdot)$ 509 ($u_{23}^a \cdot u_{23}^b$, $u_{23}^b \cdot u_{24}^a$, $u_{24}^a \cdot u_{24}^b$). Parameters $\theta$ of the encoder 505 are updated via backpropagation 510 to minimize the contrastive loss function $\mathcal{L}(\cdot)$. A classification layer 511 is then used to perform classification (e.g., binary classification, indicating whether embeddings $u_i^k$ are similar or not). This is represented in FIG. 5, as the image transforms $x_{23}^a$ and $x_{23}^b$ (e.g., transforms applied to the same input image $x_{23}$) and image transforms $x_{24}^a$ and $x_{24}^b$ (e.g., transforms applied to the same input image $x_{24}$) produce positive pairs, while the image transforms $x_{23}^b$ and $x_{24}^a$ (e.g., transforms applied to different input images $x_{23}$ and $x_{24}$) produce a negative pair.

Graph networks are sets of vertices or nodes connected by edges or links. Graph networks can provide rich compositional or contextual information, along with unique opportunities for contextual data analysis. Unsupervised pattern recognition methods, such as clustering, may make use of a similarity metric such as Euclidean distance to infer structure from unstructured data. In some embodiments, an angular similarity metric $\Phi_{ij}$ as shown in Equation (2) is used to infer structure from unstructured image data:

$$\Phi_{ij} = 1 - \frac{\arccos(u_i \cdot u_j)}{\pi}$$

where $u_i$ and $u_j$ are the image embeddings at i and j, respectively, and $\pi$ is the mathematical constant. The image embeddings $u_i$ and $u_j$ are obtained from the trained image encoder $f_\theta(\cdot)$. The resulting $\Phi_{ij}$ metrics are used to construct an adjacency matrix of a graph network which is used in an image clustering algorithm.

An undirected simple graph G is defined as a pair (V, E) where $v_n \in V$ are the nodes of G, and $e \in E$ are the edges of G that connect the nodes. In a simple graph, all edges connect distinct vertices and there can be at most one edge between a given pair of vertices, and there are no self-loops. Each $e \in E$ is an unordered pair of vertices, with the edge connecting distinct vertices o and p written as a pair (o, p). Graph G is also defined by an adjacency matrix A of n×n dimensions containing the elements $a_{ij} \in A$, where $a_{ij}=1$ if $v_i$ and $v_j$ share an edge, and $a_{ij}=0$ otherwise as illustrated in Equation (3):

$$a_{ij} = \begin{cases} 1, & \text{if } (i, j) \in E \\ 0, & \text{otherwise} \end{cases}$$

A of G is symmetrical about diag(A), and the diagonal elements of A are zeros (e.g., $a_{ij}=0$, if i=j) when G is an undirected simple graph, as it contains no self-loops. The strictly upper triangle of A is the mirror image of the strictly lower triangle of A when G is an undirected simple graph. Thus, in the undirected simple graph G, the strictly upper triangle of A is sufficient to represent G.

A list U contains image embeddings $u \in U$, where each u is a low-dimension vector or tensor (e.g., a 128-dimensional vector or tensor, or some other low dimension vector reduced from the output of the fully connected layer of the CNN) and U is of length n. Each u is compared against all $u \in U$ using the angular similarity metric $\Phi_{ij} \in [0,1]$ from Equation (2) above, where $\Phi_{ij} \geq 0$ indicates the similarity of $u_i$ and $u_j$, and i and j are positive integers $\leq n$. Angular similarity values of $\Phi_{ij}=1$ indicate that $u_i=u_j$.

An end-user can define a threshold $\varepsilon \in [0,1]$ of $\Phi_{ij}$, whereby $\Phi_{ij} < \varepsilon$ is mapped to zero and $\Phi_{ij} \geq \varepsilon$ is mapped to one as shown in Equation (4):

$$a_{ij} = \begin{cases} 1, & \text{if } \Phi_{ij} \geq \varepsilon \\ 0, & \text{if } \Phi_{ij} < \varepsilon \end{cases}$$

The thresholding value E is important, as $a_{ij}=H[\Phi_{ij}, \varepsilon]$ in the algorithm where $H[\cdot]$ represents a shifted Heaviside unit step function. Adjacency matrix A contains E of G, and therefore greater $\varepsilon$ values decreased E, whereas lower $\varepsilon$ values increase E. Thus, $\varepsilon$ serves as a hyperparameter for graph coarsening as $G=A=H[\Phi_{ij}, \varepsilon]$. This approach may be referred to or described as an all-pairs similarity search (APSS). In some embodiments, $0.7 \leq \varepsilon \leq 0.9$ provides favorable outcomes, although other values of E may be used in other embodiments. It should be noted that it is not required to calculate all n×n similarities of all possible pairs in U, as only the strictly upper triangle of A is required as noted above. Further, only calculating the strictly upper triangle of A simplifies the calculation of A to O($n^2/2-n/2$). The triangular number of a n×n matrix is ($n^2/2+n/2$) and subtracting the diag($\cdot$) of the matrix (e.g., subtracting n) from the triangular number provides ($n^2/2-n/2$).

Application of the shifted Heaviside unit step function $H[\Phi_{ij}, \varepsilon]$ provides A, which results in G. Hierarchical graph clustering of G may be achieved via a community detection algorithm, such as the Louvain community detection algorithm, which maximizes the modularity Y of the communities $c \in G$. The Louvain community detection algorithm is inspired by the idea that c can be destroyed by randomizing G, thus comparing $E_{actual} \in G$ and $E_{random} \in G$ affirms the credibility of $c \in G$. In order to maximize Y, the Louvain community detection algorithm recursively attempts to maximize the difference between $E_{actual} \in G$ and $E_{random} \in G$ by removing $v_i$ from $c_i$ and placing $v_i$ into $c_j$. The Louvain community detection algorithm is initialized by assigning a unique $c \forall v \in G$. The maximization of Y by moving $a_{ij}$ into a different c is recursively defined using Equation (5):

$$Y = \frac{1}{2h} \sum_{ij} \left( a_{ij} - \frac{d_i d_j}{2h} \right) \delta(c_i, c_j)$$

where h is the number of $E \in G$, $a_{ij}$ is a $v \in G$, $d_i$ and $d_j$ are the degrees (e.g., the number of incident edges) of $v_i$ and $v_j$, respectively, and the $\delta$ term is the Kronecker delta of $c_i$ and $c_j$. The calculation of Equation (5) may be repeated $\forall a_{ij}$ until Y is maximized. The Louvain community detection algorithm is chosen in some embodiments because it affords decreased computational time, as compared with some other community detection algorithms, while providing high quality results. As previously noted, the selection of the thresholding value E impacts the clustering results, and $0.7 \leq \varepsilon \leq 0.9$ provides favorable results in some embodiments. The image clustering algorithm is advantageously constructed for flexibility in that the minimum cluster size cut-off κ is user-defined, where K is an integer >1, and cluster sizes <κ are not assigned cluster names.

Figure 6:
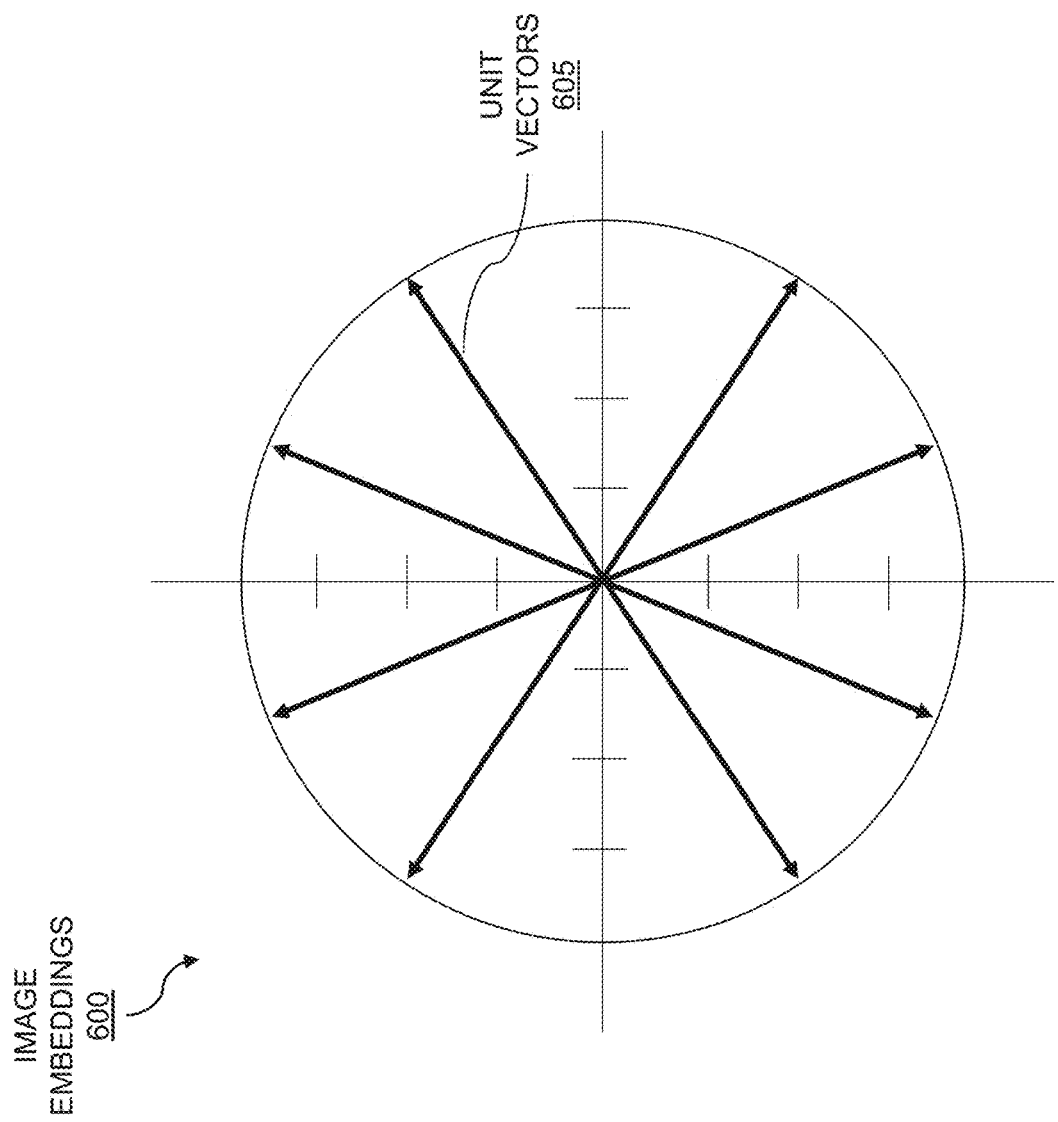
FIG. 6 shows an example of image embeddings and unit vectors in an illustrative embodiment.
Figure 7:
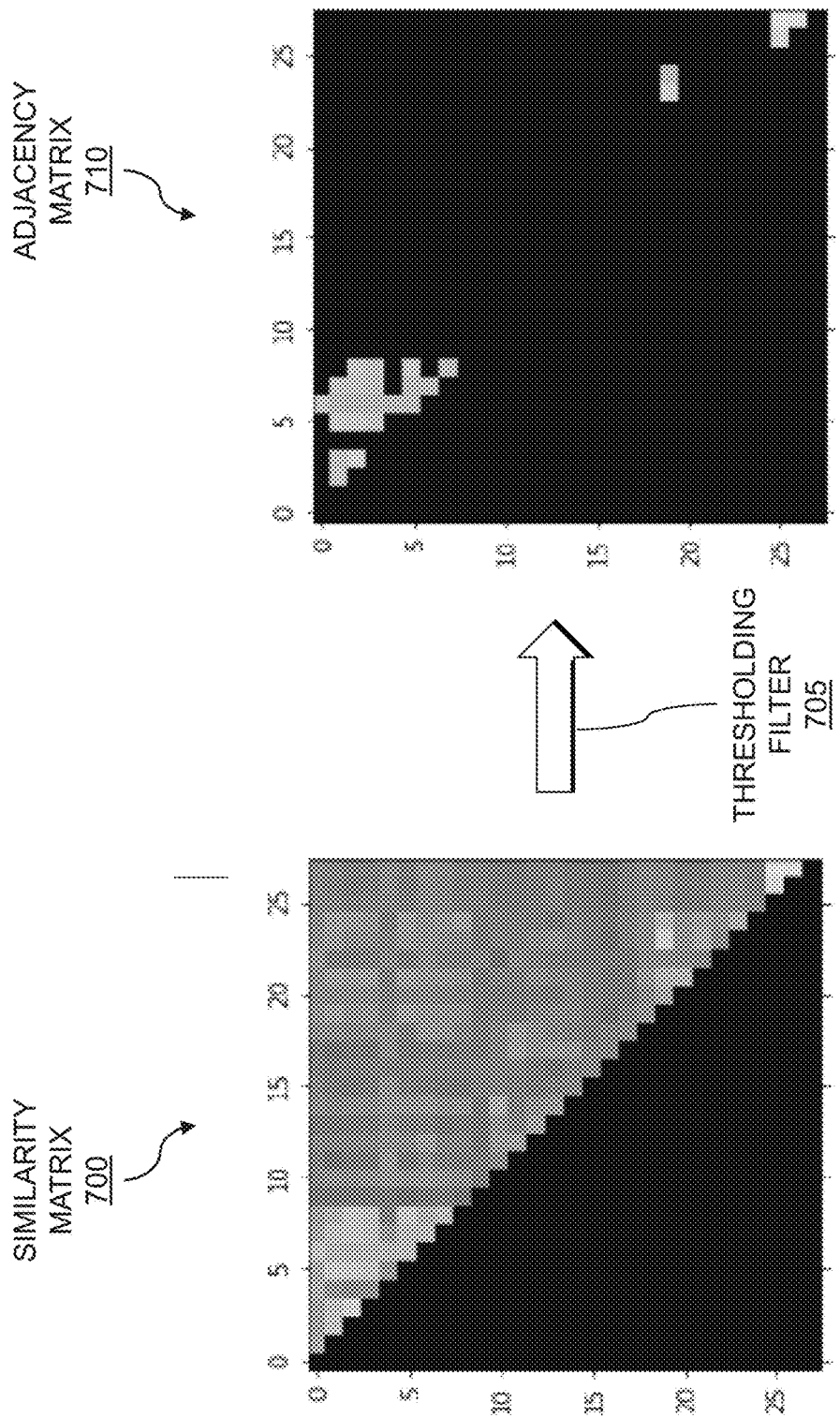
FIG. 7 shows application of a thresholding filter to a similarity matrix to produce an adjacency matrix in an illustrative embodiment.

FIG. 6 illustrates image embeddings 600. The image embeddings 600 may include a 128-dimension unit vector, of which a subset of unit vectors 605 are shown. Image similarity may be calculated using cosine similarity, where the smaller the angle between the unit vectors 605 the more similar the images. FIG. 7 illustrates approximate matches of the image embeddings, used to create a similarity matrix 700. A thresholding filter 705 is applied to the similarity matrix 700 to produce an adjacency matrix 710. The adjacency matrix 710 is a sparse matrix, used to define edges in the graph network shown in FIG. 8. In the FIG. 7 example, a threshold of ≥70% similarity was used by the thresholding filter 705. FIG. 8 illustrates a graph network 800, where each dot represents an image. As shown, the images have no defined connections, network or relationships in the graph network 800. Following application of the image clustering techniques described herein, the graph network 800 is updated to produce the graph network with clusters of similar images 805. Each densely-connected series of nodes represents a cluster of similar images. The clusters of similar images may be detected using a user-defined threshold for similarity.

Figure 9:
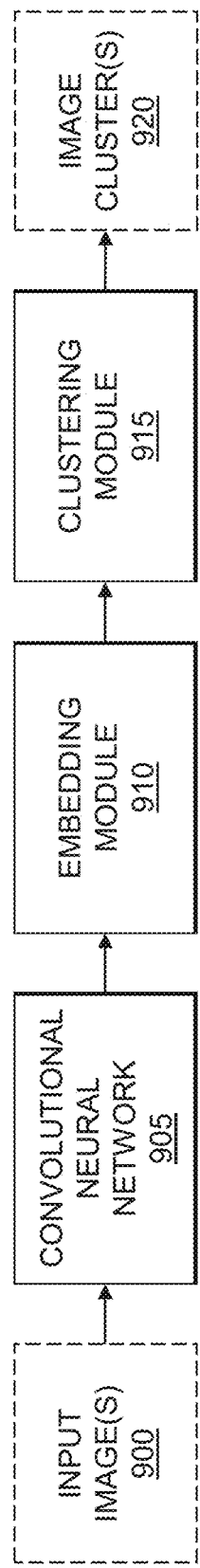
FIG. 9 shows a system configured for producing image clusters in an illustrative embodiment.

FIG. 9 illustrates a system flow, where input images 900 are provided to a CNN 905. The output of the CNN network 905 (e.g., from a fully connected layer) is subject to dimensionality reduction and normalization in an embedding module 910 to produce image embeddings. The image embeddings are provided to a clustering module 915, which generates clusters of similar images 920 provided as output. The system of FIG. 9, and other systems and algorithms described herein, provides an efficient approach for the clustering of image data sets. The application of similarity calculations to image embeddings enables construction of relationships between previously unstructured image data. The result of the image similarity calculations is a graph network of images that meet or exceed a user-defined similarity threshold value. The resulting graph network is subject to a community detection algorithm to provide image clusters, and demonstrates reasonable cluster contents when applied to sample data sets as described below with respect to FIGS. 10 and 11.

Figure 10:
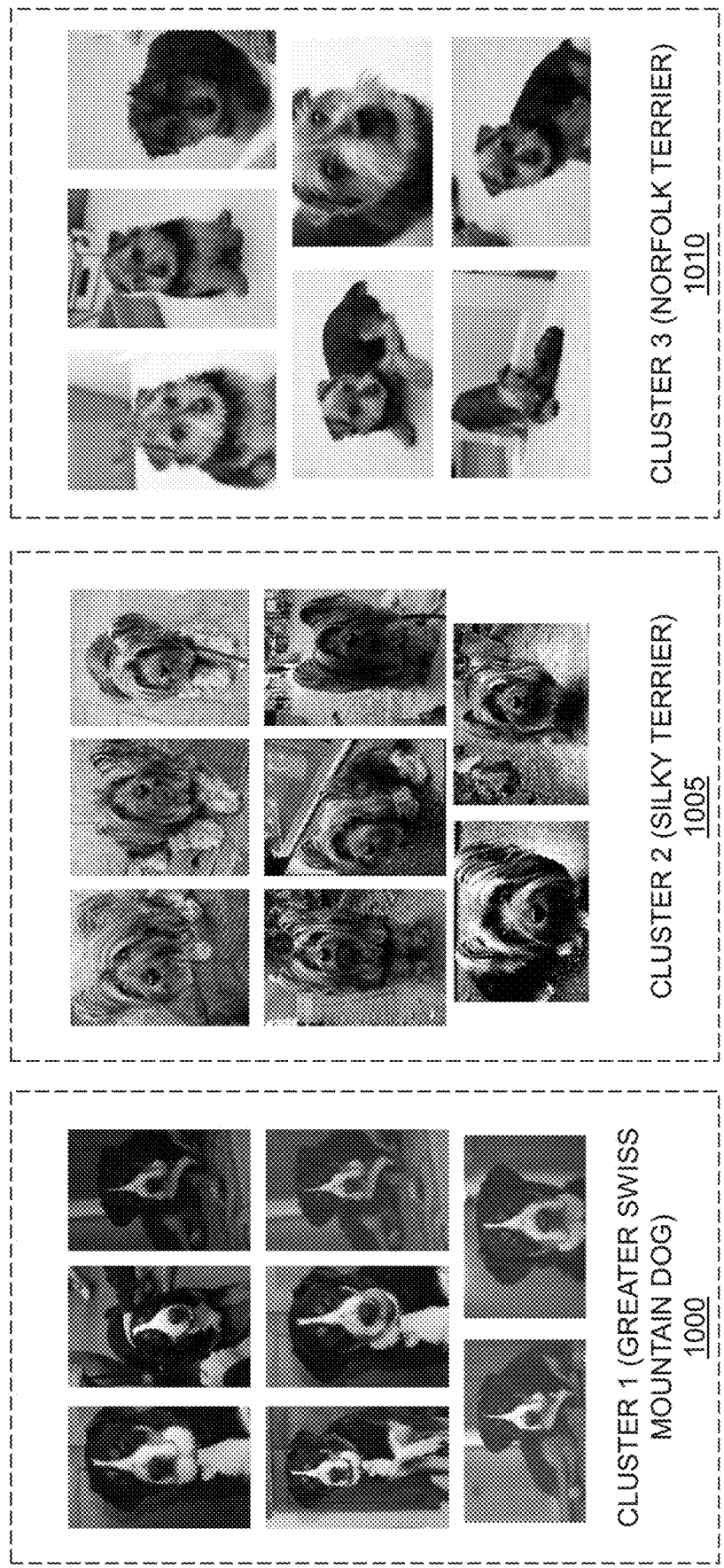
FIG. 10 shows examples of image clusters produced using an image cluster algorithm in an illustrative embodiment.

FIG. 10 illustrates a set of image clusters 1000, 1005 and 1010 of images of dog breeds (e.g., Greater Swiss Mountain Dog, Silky Terrier and Norfolk Terrier) produced via application of the image clustering algorithm described herein to the Stanford Dogs image data set, which contains approximately 20,000 images of dogs. To produce the clusters shown in FIG. 10, the following parameters were used in the image clustering algorithm: $n=20,580$, $\varepsilon=0.70$, $\kappa=2$. This resulted in 1,031 unique clusters of 2 or more members, with the largest cluster containing 24 members. FIG. 10 shows just three examples of clusters 1000, 1005 and 1010 for illustration. As illustrated by the example clusters 1000, 1005 and 1010 shown in FIG. 10, the image clustering algorithm advantageously places images of similar-looking dogs, often dogs of the same breed, into distinct clusters. If the threshold value ε is increased (e.g., to $\varepsilon=0.75$), the image clustering algorithm clusters only dogs of the same breed. This result is encouraging, as the source data set contains a broad variety of images with 120 different breeds of dogs. Further, this demonstrates the ability of the image clustering algorithms described herein to detect similar images, as the data set did not contain unique classes and there was no opportunity to split the data based on coarse classes (e.g., as all images in the source data set were of dogs).

Figure 11:
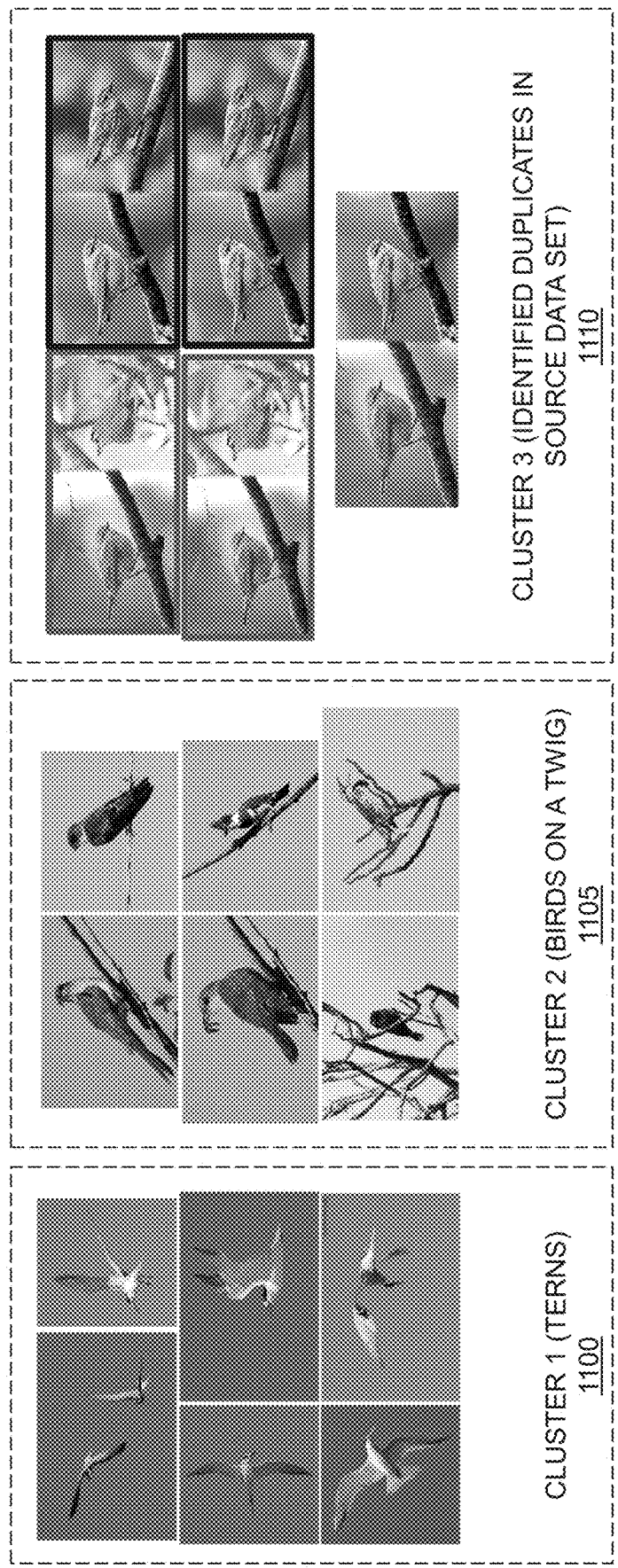
FIG. 11 shows examples of image clusters produced using an image cluster algorithm in an illustrative embodiment.

FIG. 11 illustrates another set of image clusters 1100, 1105 and 1110 of images of birds (e.g., Terns, Birds on a Twig, and Identified Duplicates) produced via application of the image clustering algorithm described herein to the Caltech-UCSD Birds image data set, which contains approximately 6,000 images of birds. Images of birds are known to be exceedingly difficult to categorize and recognize with computer vision techniques, as bird species have subtle variations in their posture, plumage and coloration. To produce the clusters shown in FIG. 11, the following parameters were used in the image clustering algorithm: $n=6,033$, $\varepsilon=0.70$, $\kappa=2$. This resulted in 450 unique clusters of 2 or more members, with the largest cluster containing 33 members. As illustrated by the example cluster 1100 shown in FIG. 11, the image clustering algorithm advantageously clusters together images of the same species of bird into distinct clusters. As illustrated by the example cluster 1105 shown in FIG. 11, the image clustering algorithm can also advantageously cluster together images of a same scene type. As illustrated by the example cluster 1110 shown in FIG. 11, the image clustering algorithm can further advantageously identify previously unknown duplicate images and errors in the data set. If the threshold value ε is increased (e.g., to $\varepsilon=0.75$), the image clustering algorithm clusters only birds of the same breed.

The image clustering techniques described herein may be used in various image analysis use cases. For example, a device vendor may want to monitor the types of images that customers of their devices are posting. This may include monitoring how the types of images changes over time. As another example, a device vendor may want to monitor third party repair vendors, to identify and track repair volume for their devices (e.g., including detecting fraudulent warranty requests).

Illustrative embodiments provide a number of advantages relative to conventional approaches. For example, the automated image clustering algorithms described herein provide next generation artificial intelligence (AI). Some AI approaches rely on expensive deep layered graphics processing unit (GPU)-based methods, which provide high amounts of computing power but come at significant costs. The automated image clustering algorithms described herein allow use of significantly lower amounts of computing power, thus saving costs for computing vision and graph technology tasks. In some embodiments, the automated image clustering algorithms utilize image embeddings and cosine similarity to detect images altered for fraudulent purposes, and to utilize image similarity to create graph networks. Further, some embodiments enable end users to tune the degree of similarity in the image clustering algorithm. Similarity may be use case dependent; some use cases may demand a stringent similarity metric to retrieve only extremely similar images, while other uses cases necessitate a more relaxed similarity metric for retrieving a broader set of images.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based analysis of computing device images included in requests to service computing devices will now be described in greater detail with reference to FIGS. 12 and 13. Although described in the context of system 100, these platforms may also be used to implement at least portions of other information processing systems in other embodiments.

Figure 12:
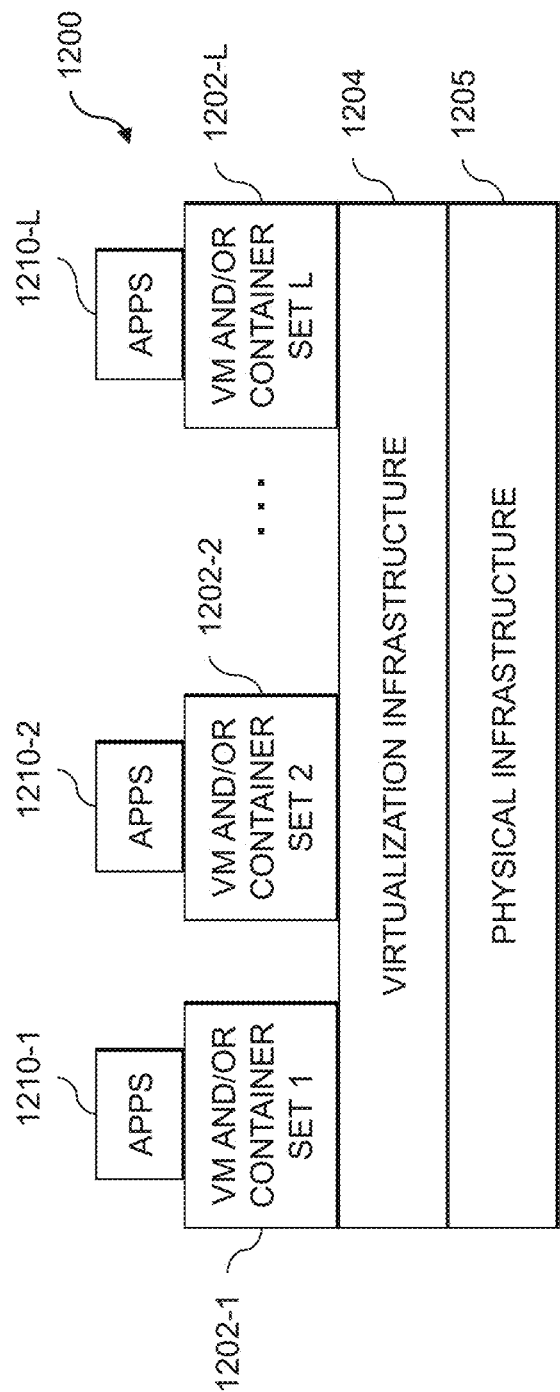

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, ... 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, ... 1210-L running on respective ones of the VMs/container sets 1202-1, 1202-2, ... 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, ... 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based analysis of computing device images included in requests to service computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, images, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a service request for a given computing device, the service request comprising a given image of the given computing device, the given image comprising user identifying information for a user submitting the service request for the given computing device;
generating, utilizing a machine learning model, a given image embedding for the given image;
determining similarity measures between the given image embedding for the given image and one or more other image embeddings for one or more other images of computing devices utilizing an angular similarity metric;
identifying whether the given image exhibits at least a threshold level of similarity to at least one of the one or more other images based at least in part on the determined similarity measures;
classifying the given image as potentially fraudulent responsive to identifying the given image as exhibiting at least the threshold level of similarity to said at least one of the one or more other images; and
modifying processing of the service request responsive to classifying the given image as potentially fraudulent.

2. The apparatus of claim 1 wherein the given image further comprises device identifying information for the given computing device.

3. The apparatus of claim 2 wherein the device identifying information for the given computing device comprises at least a portion of at least one of a serial number and a product tag of the given computing device.

4. The apparatus of claim 2 wherein classifying the given image as potentially fraudulent comprises determining that at least one of the device identifying information and the user identifying information in the given image comprises a modification of at least one of device identifying information and user identifying information in said at least one of the one or more other images.

5. The apparatus of claim 1 wherein the machine learning model comprises a convolutional neural network, the convolutional neural network comprising one or more convolutional layers, one or more pooling layers, and a fully connected layer.

6. The apparatus of claim 5 wherein the given image embedding for the given image comprises a normalized representation of an output of the fully connected layer.

7. The apparatus of claim 6 wherein the output of the fully connected layer of the machine learning model is subject to dimensionality reduction prior to normalization to produce the given image embedding for the given image.

8. The apparatus of claim 1 wherein the machine learning model is trained utilizing a contrastive loss function that determines similarity between pairs of images in a training data set, the pairs of images in the training data set comprising two or more copies of at least one image having different image transforms applied thereto.

9. The apparatus of claim 1 wherein the angular similarity metric comprises a cosine similarity metric.

10. The apparatus of claim 1 wherein the at least one processing device is further configured to perform the step of generating a graph network of a plurality of images comprising the given image and the one or more other images, the graph network comprising nodes representing respective ones of the plurality of images and edges connecting pairs of images in the plurality of images, the edges being created based at least in part on the determined similarity measures.

11. The apparatus of claim 10 wherein determining the similarity measures between the given image embedding for the given image and the one or more other image embeddings for one or more other images of computing devices utilizing the angular similarity metric comprises generating a similarity matrix having entries comprising the similarity measures.

12. The apparatus of claim 11 wherein identifying the given image as exhibiting at least the threshold level of similarity to said at least one of the one or more other images based at least in part on the determined similarity measures comprises applying a thresholding filter to the similarity matrix to produce an adjacency matrix, the adjacency matrix having entries comprising values defining the edges of the graph network.

13. The apparatus of claim 10 wherein the at least one processing device is further configured to perform the step of detecting one or more clusters of images in the plurality of images by applying one or more community detection algorithms to the graph network.

14. The apparatus of claim 13 wherein the one or more community detection algorithms comprise a Louvain community detection algorithm.

15. A computer program product comprising a non-transitory processor-readable storage medium having stored therein program code of one or more software programs, wherein the program code when executed by at least one processing device causes the at least one processing device to perform steps of:
receiving a service request for a given computing device, the service request comprising a given image of the given computing device, the given image comprising user identifying information for a user submitting the service request for the given computing device;
generating, utilizing a machine learning model, a given image embedding for the given image;
determining similarity measures between the given image embedding for the given image and one or more other image embeddings for one or more other images of computing devices utilizing an angular similarity metric;
identifying whether the given image exhibits at least a threshold level of similarity to at least one of the one or more other images based at least in part on the determined similarity measures;
classifying the given image as potentially fraudulent responsive to identifying the given image as exhibiting at least the threshold level of similarity to said at least one of the one or more other images; and modifying processing of the service request responsive to classifying the given image as potentially fraudulent.

16. The computer program product of claim 15 wherein the given image further comprises device identifying information for the given computing device.

17. The computer program product of claim 16 wherein classifying the given image as potentially fraudulent comprises determining that at least one of the device identifying information and the user identifying information in the given image comprises a modification of at least one of device identifying information and user identifying information in said at least one of the one or more other images.

18. A method comprising steps of:

receiving a service request for a given computing device, the service request comprising a given image of the given computing device, the given image comprising user identifying information for a user submitting the service request for the given computing device;

generating, utilizing a machine learning model, a given image embedding for the given image;

determining similarity measures between the given image embedding for the given image and one or more other image embeddings for one or more other images of computing devices utilizing an angular similarity metric;

identifying whether the given image exhibits at least a threshold level of similarity to at least one of the one or more other images based at least in part on the determined similarity measures;

classifying the given image as potentially fraudulent responsive to identifying the given image as exhibiting at least the threshold level of similarity to said at least one of the one or more other images; and modifying processing of the service request responsive to classifying the given image as potentially fraudulent;

wherein the method is performed by at least one processing device comprising a processor coupled to a memory.

19. The method of claim 18 wherein the given image further comprises device identifying information for the given computing device.

20. The method of claim 19 wherein classifying the given image as potentially fraudulent comprises determining that at least one of the device identifying information and the user identifying information in the given image comprises a modification of at least one of device identifying information and user identifying information in said at least one of the one or more other images.

* * * * *